(12) United States Patent
Ionin et al.

(10) Patent No.: US 12,535,961 B2
(45) Date of Patent: Jan. 27, 2026

(54) ADAPTIVE HOST MEMORY BUFFER TRAFFIC CONTROL BASED ON REAL TIME FEEDBACK

(71) Applicant: Sandisk Technologies, Inc., Milpitas, CA (US)

(72) Inventors: Michael Ionin, Rehovot (IL); Alexander Bazarsky, Holon (IL); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 596 days.

(21) Appl. No.: 17/897,928

(22) Filed: Aug. 29, 2022

(65) Prior Publication Data

US 2022/0413726 A1    Dec. 29, 2022

Related U.S. Application Data

(63) Continuation-in-part of application No. 16/932,477, filed on Jul. 17, 2020, now Pat. No. 11,734,018.

(51) Int. Cl.
G06F 3/06         (2006.01)

(52) U.S. Cl.
CPC .......... *G06F 3/0635* (2013.01); *G06F 3/0613* (2013.01); *G06F 3/0656* (2013.01); *G06F 3/0673* (2013.01)

(58) Field of Classification Search
CPC ..................................... G06F 1/32; G06F 9/44
See application file for complete search history.

(56) References Cited

U.S. PATENT DOCUMENTS

| | | | |
|---|---|---|---|
| 8,254,568 B2 | 8/2012 | Smith et al. | |
| 9,563,382 B2 | 2/2017 | Hahn et al. | |
| 9,575,768 B1 | 2/2017 | Kim | |
| 9,983,889 B1 | 5/2018 | Sarmah | |
| 10,055,236 B2 | 8/2018 | Erez et al. | |
| 10,310,747 B2 * | 6/2019 | Owa | G06F 3/0661 |
| 10,360,156 B2 | 7/2019 | Yun et al. | |
| 10,558,367 B2 | 2/2020 | Benisty | |
| 10,613,778 B2 | 4/2020 | Hahn et al. | |

(Continued)

FOREIGN PATENT DOCUMENTS

| | | |
|---|---|---|
| CN | 102135891 A | 7/2011 |
| CN | 104866334 A | 8/2015 |

(Continued)

*Primary Examiner* — Keshab R Pandey
(74) *Attorney, Agent, or Firm* — Patterson + Sheridan, LLP

(57) ABSTRACT

Boot code is loaded to the data storage device controller in a flexible manner by being able to receive chunks of the boot code from two separate locations, the host memory buffer (HMB) and the memory device, which may be a NAND device. Part of the boot code may be received from the HMB and another part of the boot code may be received from the memory device. If either the HMB or the memory device can deliver the chunks faster than the other, then the controller can receive the chunks from the faster location and periodically confirm the speed of delivery to ensure the boot code latency is optimized. The controller is configured to track an HMB turnaround latency and derive whether a next request should be sent to the HMB or the memory device when the data is present in both the HMB and the memory device.

7 Claims, 10 Drawing Sheets

(56) References Cited

U.S. PATENT DOCUMENTS

| | | |
|---|---|---|
| 10,712,949 B2 | 7/2020 | Hahn et al. |
| 11,010,095 B2 | 5/2021 | Richter et al. |
| 11,036,425 B2 | 6/2021 | Lee et al. |
| 2005/0283598 A1 | 12/2005 | Gaskins et al. |
| 2007/0033311 A1 | 2/2007 | Young et al. |
| 2008/0052477 A1* | 2/2008 | Lee ............ G06F 12/127 711/E12.019 |
| 2008/0229090 A1 | 9/2008 | Choi et al. |
| 2013/0047031 A1 | 2/2013 | Tabone et al. |
| 2014/0201477 A1* | 7/2014 | Greenfield ......... G06F 3/0608 711/158 |
| 2014/0244989 A1 | 8/2014 | Hiltgen et al. |
| 2016/0188224 A1* | 6/2016 | Yin ............ G06F 3/0659 711/154 |
| 2017/0242606 A1 | 8/2017 | Vlaiko et al. |
| 2017/0336973 A1* | 11/2017 | Chakraborty ....... G06F 12/0607 |
| 2018/0173536 A1 | 6/2018 | Sela et al. |
| 2019/0042460 A1 | 2/2019 | Trika et al. |
| 2019/0042757 A1 | 2/2019 | Ho et al. |
| 2019/0138220 A1* | 5/2019 | Hahn ............ G06F 3/0611 |
| 2020/0151055 A1 | 5/2020 | Eom et al. |
| 2021/0191884 A1 | 6/2021 | Hwang et al. |
| 2022/0019443 A1 | 1/2022 | Benisty et al. |

FOREIGN PATENT DOCUMENTS

| | | |
|---|---|---|
| CN | 105518621 A | 4/2016 |
| CN | 107683479 A | 2/2018 |
| CN | 108694060 A | 10/2018 |
| CN | 109478135 A | 3/2019 |
| CN | 109901847 A | 6/2019 |
| CN | 110032520 A | 7/2019 |
| CN | 111008045 A | 4/2020 |
| JP | 5254449 B2 | 8/2013 |

* cited by examiner

ADAPTIVE HOST MEMORY BUFFER TRAFFIC CONTROL BASED ON REAL TIME FEEDBACK

CROSS-REFERENCE TO RELATED APPLICATION

This application is a continuation-in-part of co-pending U.S. patent application Ser. No. 16/932,477, filed Jul. 17, 2020. The aforementioned related patent application is herein incorporated by reference.

BACKGROUND OF THE DISCLOSURE

Field of the Disclosure

Embodiments of the present disclosure generally relate to data storage devices, such as solid state drives (SSDs), having access to an external memory device, such as a host memory buffer (HMB), and, more specifically, determining whether to access the external memory device or an internal memory device when both the external memory device and the internal memory device stores the same data.

Description of the Related Art

The initiation process of a computing system is usually referred to as boot or booting. During the boot procedure, a designated code is loaded into the processing unit placed at the memory device controller in order to initiate the awakening procedure of the data storage device. The duration of the boot is an important factor for consumers, and the time for the controller to load the boot code from an external location where the boot code is stored may be of high consideration to allow standing in the overall boot duration requirements.

For NAND based memory devices, the default storage place for the boot code is in the NAND memory itself. However, the NVMe standard provides a further option at which the host device DRAM partition (i.e., the portion of the host DRAM that is allocated for the data storage device) may be used for storing the boot code. When using the host DRAM for boot code storage, the DRAM partition is referred to as the host memory buffer (HMB).

Currently, the boot procedure proceeds by initiating booting from a single location, either the NAND or the HMB. Both NAND and HMB have pros and cons. For NAND, the NAND is usually available prior to the HMB and parallel sense can occur on multiple dies, however, the sense time may be a detriment. For HMB, there is high throughput and the HMB might, in some cases, be available before the NAND, but HMB is not always available in boot, depends upon the host device, and must have a link to the host device.

Therefore, there is a need in the art for accessing either the NAND or the HMB based on access latency when both the NAND and the HMB includes the same data being accessed.

SUMMARY OF THE DISCLOSURE

The present disclosure generally relates to data storage devices, such as solid state drives (SSDs), having access to an external memory device, such as a host memory buffer (HMB), and, more specifically, determining whether to access the external memory device or an internal memory device when both the external memory device and the internal memory device stores the same data. Boot code is loaded to the data storage device controller in a flexible manner by being able to receive chunks of the boot code from two separate locations, the host memory buffer (HMB) and the memory device, which may be a NAND device. Part of the boot code may be received from the HMB and another part of the boot code may be received from the memory device. If either the HMB or the memory device can deliver the chunks faster than the other, then the controller can receive the chunks from the faster location and periodically confirm the speed of delivery to ensure the boot code latency is optimized. The controller is configured to track an HMB turnaround latency and derive whether a next request should be sent to the HMB or the memory device when the data is present in both the HMB and the memory device.

In one embodiment, a data storage device includes a memory device and a controller coupled to the memory device. The controller is configured to track a turnaround latency of another memory device, where the another memory device is external to the data storage device, and derive whether a next request should be sent to the another memory device or the memory device when a same data is present in both the another memory device and the memory device.

In another embodiment, a data storage device includes a memory device and a controller coupled to the memory device. The controller includes a latency control module. The latency control module is configured to track a turnaround latency to complete a request directed towards another memory device, where the another memory device is external to the data storage device, determine whether the turnaround latency is greater than or equal to a threshold latency, and set an indication to read from the memory device or the another memory device for a same data stored in both the memory device and the another memory device based on the determining.

In another embodiment, a data storage device includes memory means and a controller coupled to the memory means. The controller is configured to receive a read request from a host device, determine that a read address corresponding to the read request exists in both the memory means and an another memory means, where the another memory means is disposed in the host device, and retrieve the read address from either the memory means or the another memory means based on a tracked turnaround latency, where the tracked turnaround latency corresponds to a completion latency of one or more previously completed read address retrieval commands.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), having access to an external memory device, such as a host memory buffer (HMB), and, more specifically, determining whether to access the external memory device or an internal memory device when both the external memory device and the internal memory device stores the same data. Boot code is loaded to the data storage device controller in a flexible manner by being able to receive chunks of the boot code from two separate locations, the host memory buffer (HMB) and the memory device, which may be a NAND device. Part of the boot code may be received from the HMB and another part of the boot code may be received from the memory device. If either the HMB or the memory device can deliver the chunks faster than the other, then the controller can receive the chunks from the faster location and periodically confirm the speed of delivery to ensure the boot code latency is optimized. The controller is configured to track an HMB turnaround latency and derive whether a next request should be sent to the HMB or the memory device when the data is present in both the HMB and the memory device.

Figure 1:
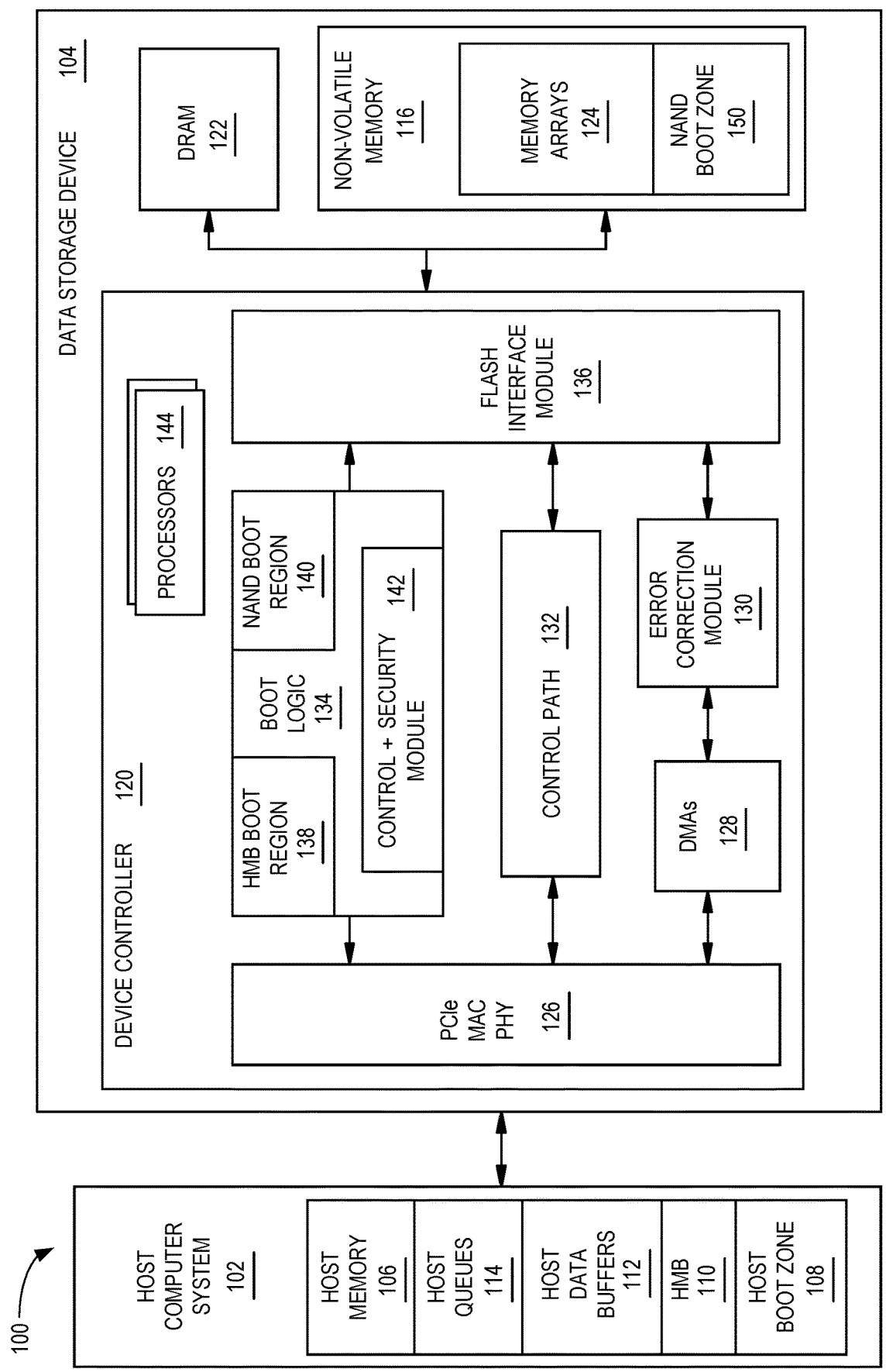
FIG. 1 is a schematic illustration of a data storage system, according to one embodiment.

FIG. 1 is a schematic illustration of a data storage system 100, according to one embodiment. The data storage system 100 includes a host computer system 102 and a data storage device 104. The data storage device 104 may function as a storage device for the host computer system 102. For instance, the host computer system 102 may utilize a non-volatile memory (NVM) 116, such as NAND, included in the data storage device 104 to store and retrieve data. In some examples, the data storage system 100 may include a plurality of storage devices, such as the data storage device 104, which may operate as a storage array. For example, the data storage system 100 may include a plurality of data storage devices 104 configured as a redundant array of inexpensive/independent disks (RAID) that collectively function as a mass data storage device for the host computer system 102.

The host computer system 102 includes a host memory 106 that includes a host boot zone 108 that is a part of a host memory buffer (HMB) 110, a host data buffer 112, and a host queue 114. HMB 110 is a storage in the host computer system 102 host memory 106 that is allocated to the data storage device 104. The data storage device 104 is capable of utilizing the HMB 110 in whatever function is needed. In the embodiments discussed herein, the data storage device 104 utilizes the HMB 110 for storing the boot code. The host computer system 102 may store and/or retrieve data to and/or from one or more storage devices, such as the data storage device 104. The host computer system 102 may communicate with the data storage device 104 via an interface. The host computer system 102 may include any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

In some embodiments, the host queue 114 includes one or more host queues, where the host queue 114 stores generated commands for the data storage device 104 to fetch. Furthermore, the data of the generated commands in the one or more host queues 114 may be stored in the host data buffer 112. In some embodiments, the host data buffer 112 includes one or more host data buffers.

The HMB 110 of the host memory 106 may be a host DRAM partition that is allocated for the data storage device 104. A boot code (i.e., the code used for the initiation process of a computing system or a boot operation) may be stored in the HMB 110. More specifically, the boot code is stored in the host boot zone 108 of the HMB 110. During boot operations, the boot code is fetched from the HMB 110 and transferred to the device controller 120. Because HMB 110 is volatile memory, the boot code is written during the previous run-time. During boot time, and only if HMB 110 is available while the HMB 110 content is still valid, the boot code could be fetched from HMB 110.

The data storage device 104 includes a device controller 120, a volatile memory, such as a dynamic random-access memory (DRAM) 122, and an NVM 116. In some examples, the data storage device 104 may include additional components not shown in FIG. 1 for the sake of clarity. For example, the data storage device 104 may include a printed circuit board (PCB) to which components of the data storage device 104 are mechanically attached and which includes electrically conductive traces that electrically interconnect components of the data storage device 104, or the like. In some examples, the physical dimensions and connector configurations of the data storage device 104 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 104 may be directly coupled (e.g., directly soldered) to a motherboard of the host computer system 102.

In some examples, the data storage device 104 may include an interface, which may include one or both of a data bus for exchanging data with the host computer system 102 and a control bus for exchanging commands with the host computer system 102. The interface may operate in accordance with any suitable protocol. For example, the interface may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface (e.g., the data bus, the control bus, or both) is electrically connected to the device controller 120, providing electrical connection between the host computer system 102 and the device controller 120, allowing data to be exchanged between the host computer system 102 and the device controller 120. In some examples, the electrical connection of the interface may also permit the data storage device 104 to receive power from the host computer system 102. For example, a power supply may receive power from the host computer system 102 via the interface.

The data storage device 104 includes NVM 116 which may include a plurality of memory devices or memory units and an NAND boot zone 150. The plurality of memory device or memory units may be arranged into one or more memory arrays 124. The boot code, which may be the same as the boot code stored in the HMB 110 of the host computer system 102, may be stored in the one or more memory arrays 124. During boot operations, the boot code is fetched from the NAND boot zone 150 and transferred to the device controller 120.

The NVM 116 may be configured to store and/or retrieve data. For instance, a memory unit of NVM 116 may receive data and a message from the device controller 120 that instructs the memory unit to store the data. Similarly, the memory unit of NVM 116 may receive a message from the device controller 120 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 116 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 116 may include a plurality of flash memory devices or memory units. Flash memory devices may include NAND or NOR based flash memory devices and may store data based on a charge contained in a floating gate of a transistor for each flash memory cell. In NAND flash memory devices, the flash memory device may be divided into a plurality of blocks, which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices and may be single level cell (SLC), multi-level cell (MLC), triple level cell (TLC), or quad level cell (QLC). The device controller 120 may write data to and read data from NAND flash memory devices at the page level and erase data from NAND flash memory devices at the block level.

In some examples, the data storage device 104 includes a power supply, which may provide power to one or more components of the data storage device 104. When operating in a standard mode, the power supply may provide power to one or more components using power provided by an external device, such as the host computer system 102. For instance, the power supply may provide power to the one or more components using power received from the host computer system via the interface of the data storage device 104. In some examples, the power supply may include one or more power storage components configured to provide power to the one or more components when operating in a shutdown mode, such as where power ceases to be received from the external device. In this way, the power supply may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

In some examples, the data storage device 104 may include one or more volatile memories, such as the DRAM 122, which may be used by the device controller 120 to store information. Furthermore, the device controller 120 may include one or more volatile memories. In some examples, the device controller 120 may use volatile memory as a cache. For instance, the device controller 120 may store cached information in volatile memory until cached information is written to the NVM 116. Examples of volatile memory include, but are not limited to, random-access memory (RAM), DRAM, static RAM (SRAM), and synchronous dynamic RAM (SDRAM (e.g., DDR1, DDR2, DDR3, DDR3L, LPDDR3, DDR4, LPDDR4, and the like)).

The data storage device 104 includes a device controller 120, which may manage one or more operations of the data storage device 104. For instance, the device controller 120 may manage the reading of data from and/or the writing of data to the NVM 116. In some embodiments, when the data storage device 104 receives a write command from the host computer system 102, the device controller 120 may initiate a data storage command to write data to the NVM 116 and monitor the progress of the data storage command. The device controller 120 may determine at least one operational characteristic of the data storage system 100 and store the at least one operational characteristic to the NVM 116. In some embodiments, when the data storage device 104 receives a write command from the host computer system 102, the device controller 120 temporarily stores the data associated with the write command in the internal memory or a write buffer before sending the data to the NVM 116.

The device controller includes a PCIe MAC PHY 126, a boot logic 134, a control path 132, one or more direct memory accesses (DMAs) 128, an error correction module 130, a flash interface module (FIM) 136, and one or more processors 144. The one or more processors 144 is a chip or a logical circuit that responds and processes commands to operate a computing system, such as the data storage device 104. The one or more processors 144 may perform all mathematical operations and manage the controller operations.

Ingress and egress of data to the data storage device 104 from the host computer system 102 may be performed through a PCIe MAC PHY 126. If commands have been completed by the device controller 120, the data associated with the completed commands may be transferred through the PCIe MAC PHY 126 to the host queues 114 present in the host computer system 102.

Data passes from the PCIe MAC PHY 126 to the control path 132 and the one or more DMAs 128. The one or more DMAs 128 may execute data transfers between host computer system 102 and data storage device 104 without involvement from a host computer system 102 CPU. The control path 132 may be utilized for fetching physical page regions (PRPs), posting completion and interrupts, and activating the DMAs 128 for data transfer between host computer system 102 and data storage device 104. Error correction module 130 corrects the data fetched from the memory arrays. The device controller 120 may utilize the FIM 136 to interact with the NVM 116 for read and write operations.

The boot logic 134 includes a HMB boot region 138, a NAND boot region 140, and a control and security module 142. The boot logic 135 recognizes the parallel boot execution by the HMB boot zone 108 and the NAND boot zone 150. The HMB boot region 138 may determine the status of the boot from the HMB boot zone 108. Similarly, the NAND boot region 140 may determine the status of the boot from the NAND boot zone 150. The control and security module 142 may be utilized for the control and the implementation of the parallel boot execution by the HMB boot zone 108 and the NAND boot zone 150.

Figure 2:
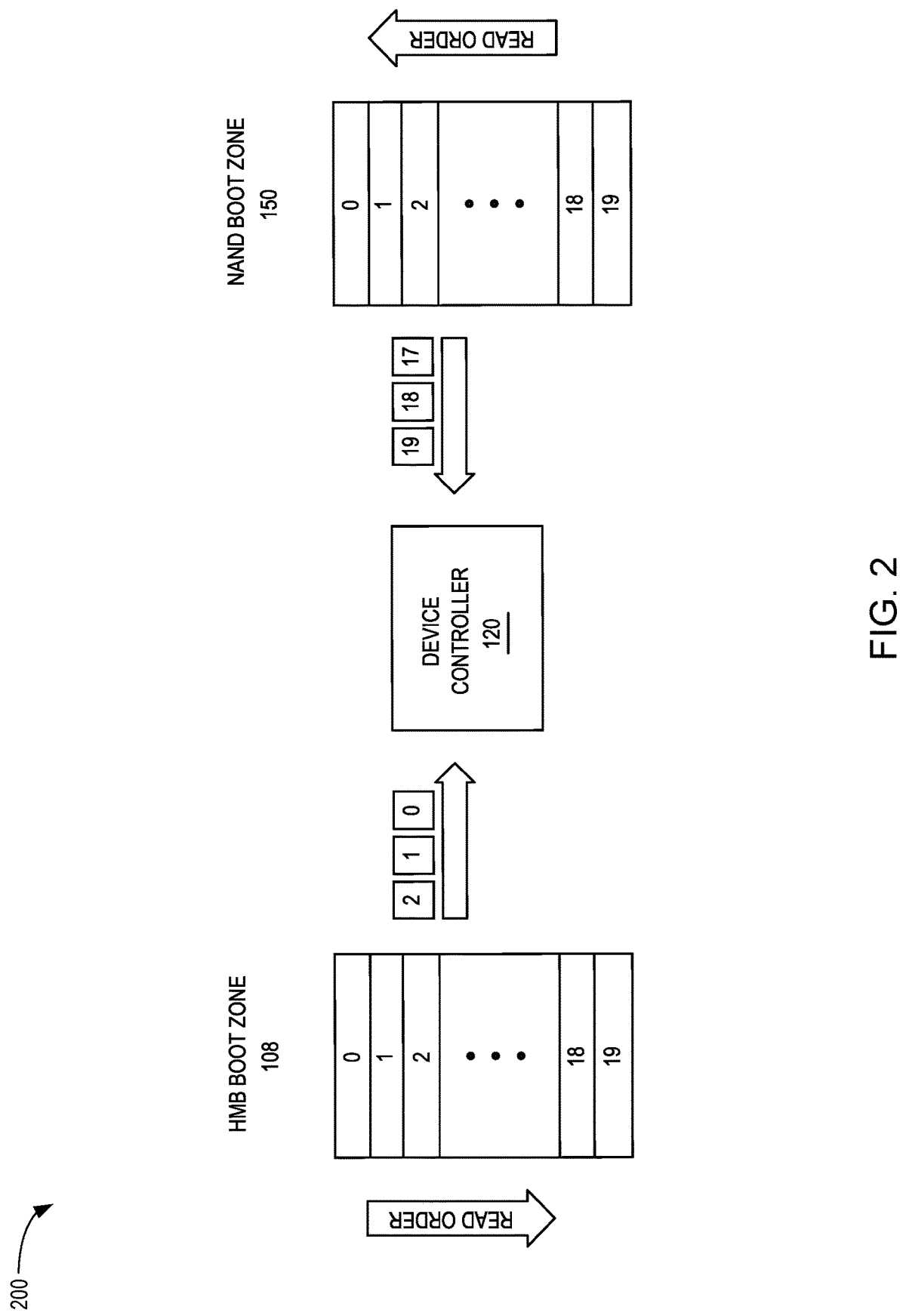
FIG. 2 is a schematic illustration of a dual boot process, according to one embodiment.

FIG. 2 is a schematic illustration of a parallel boot process, according to one embodiment. The boot code is stored in the HMB 110 and the memory arrays 124 of FIG. 1. The boot code is the same in both the host boot zone 108 and the NAND boot zone 150. The boot code, including the relevant context, of about 80 KB is divided into chunks of a predetermined size, such as about 4 KB. For example, the HMB boot zone 108 includes about 20 chunks of about 4 KB and the NAND boot zone 150 includes about 20 chunks of about 4 KB.

Illustrated in FIG. 2, the first 4 KB chunk of the boot code is denoted by a 0, the second 4 KB chunk of the boot code is denoted by a 1, and so forth. When the boot operation is initiated, the boot code chunks are fetched from the HMB boot zone 108 of the HMB 110 and the same boot code chunks are fetched from the NAND boot zone 150. The boot code chunks of both the HMB boot zone 108 and the NAND boot zone 150 are fetched concurrently at the device controller 120 during the boot operation and stored internally in controller memory, such as SRAM, of the device controller 120. In one embodiment, the fetch from the HMB boot zone 108 may occur quicker than the fetch from the NAND boot zone 150. In another embodiment, the fetch from the NAND boot zone 150 may occur quicker than the fetch from the HMB boot zone 108.

When reading the boot code from the HMB boot zone 108, the first boot code chunk 0 is read first, the second boot code chunk 1 is read second, and so forth. The read from the HMB boot zone 108 may be read from the first boot code chunk (e.g., chunk 0) to the last boot code chunk (e.g., chunk 19). When reading from the NAND boot zone 150, the last boot code chunk 19 is read first, the second-to-last boot code chunk 18 is read second, and so forth. The read from the NAND boot zone 150 may be read from the last boot code chunk (e.g., chunk 19) to the first boot code chunk (e.g., chunk 0). In another embodiment, the listed read order of the boot code chunks from the HMB boot zone 108 and the NAND boot zone 150 may be switched. When the entire boot code is read, collectively from the HMB boot zone 108 and the NAND boot zone 150, the boot operation is completed.

The entire boot code may be read partially from the HMB boot zone 108 and partially from the NAND boot zone 150, where each part of the boot code read from the HMB boot zone 108 and the NAND boot zone 150 is equal. For example, the boot code chunks 0-9 may be read from the HMB boot zone 108 and the remaining boot code chunks 10-19 may be read from the NAND boot zone 150. Because the total boot code has been read, the boot process has been completed.

In another embodiment, the entire boot code may be read partially from the HMB boot zone 108 and partially from the NAND boot zone 150, where each part of the boot code read from the HMB boot zone 108 and the NAND boot zone 150 are not equal. For example, the boot code chunks 0-13 may be read from the HMB boot zone 108 and the remaining boot code chunks 14-19 may be read from the NAND boot zone 150. Because the total boot code has been read, the boot process has been completed.

Because uneven amounts of boot code chunks may be read from the HMB boot zone and the NAND boot zone, the controller may place the relevant portion of the boot code in the HMB and the NAND. For example, if the parallel loading (i.e., the read to the controller) finishes at boot code chunk 12, then boot code chunks 0-12 are read from a first location, such as the HMB boot zone 108, and the boot code chunks 12-19 are read from a second location, such as the NAND boot zone 150. Therefore, the HMB boot zone 108 may load faster (i.e., the read to the controller is faster). Because of the faster read speed of the HMB boot zone 108, boot code chunks 0-14 (i.e., 15 boot code chunks) may be placed in the HMB and boot code chunks 11-19 (i.e., 9 boot code chunks) may be placed in the NAND. The overlap or overhead of the boot code chunks 11-14 may account for read throughput variations. The listed example is not intended to be limiting, but to provide an example of a possible embodiment.

Figure 3A:
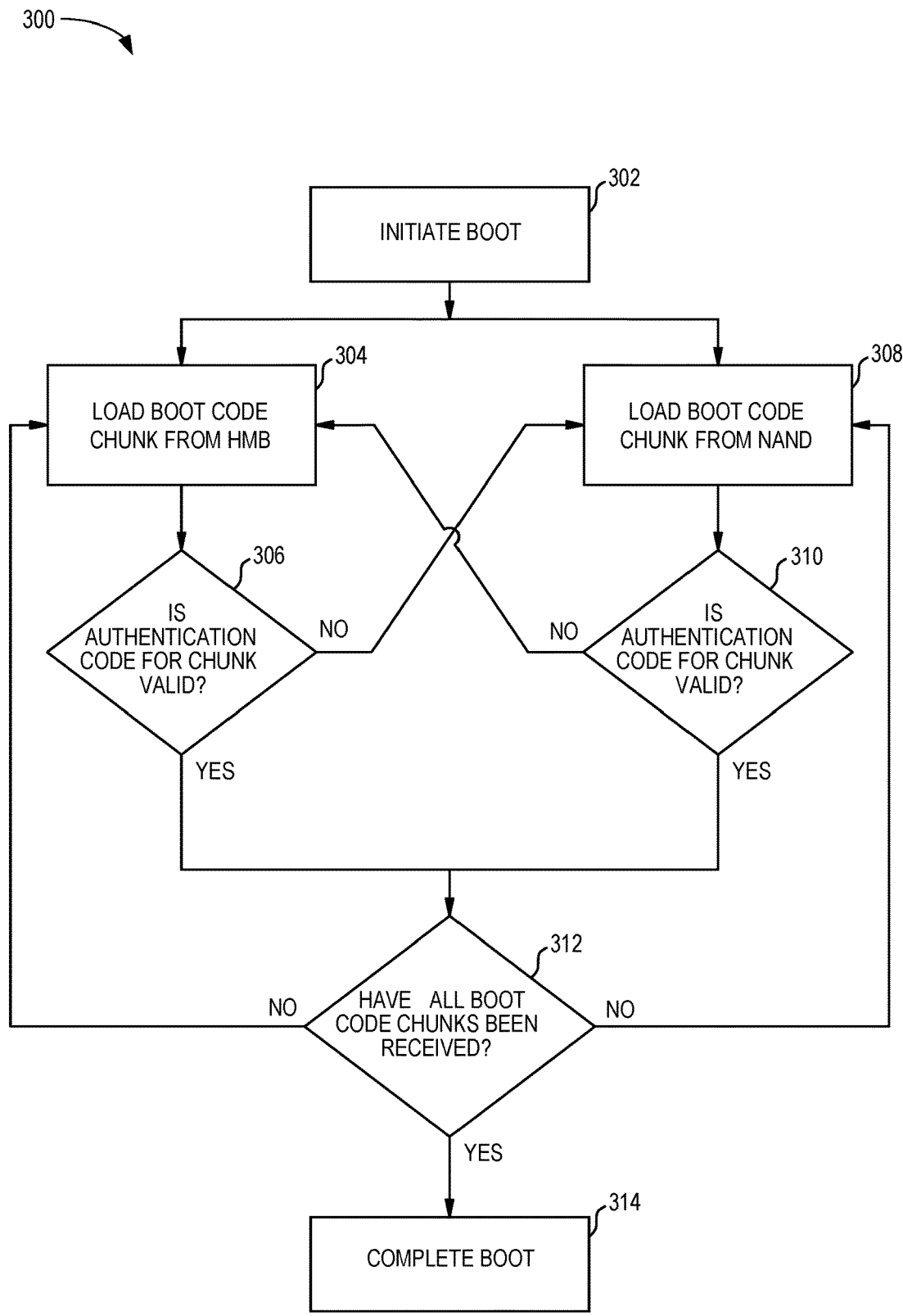
FIG. 3A is a flowchart illustrating a boot process, according to one embodiment.

FIG. 3A is a flowchart illustrating a boot process 300, according to one embodiment. The boot process 300 describes the boot operation of the data storage device when each of the boot code chunks includes an authentication code or an authentication signature. The terms "authentication code" and "authentication signature" may be used interchangeably herein and may have the same meaning. The authentication code checks for a valid boot code chunk. At block 302, the boot operation is initiated. At block 304, the boot code chunks are loaded from the HMB to the internal memory of the device controller. At block 308, the boot code chunks are loaded from the NAND boot zone to the internal memory of the device controller. The load of the boot code chunks from both the HMB and the NAND at blocks 304 and 308 may occur concurrently.

Each time that a boot code chunk is read from the HMB boot zone or the NAND boot zone and delivered to the controller, the controller checks for the valid authentication code at blocks 306 and 310. When boot code chunk includes an invalid authentication code, the controller may be configured to receive the corresponding boot code chunk from the other boot zone. The controller includes logic, such as the boot logic 134 of FIG. 1, to determine the originating location (e.g., the HMB boot zone or the NAND boot zone) of the relevant boot code chunk with the invalid authentication code. For example, if the boot code chunk 0 of the HMB boot zone includes an invalid authentication code, the controller may be configured to receive the boot code chunk 0 from the NAND boot zone to replace the invalid boot code chunk 0 received from the HMB boot zone. Likewise, if the boot code chunk 0 of the NAND boot zone includes an invalid authentication code, the controller may be configured to receive the boot code chunk 0 from the HMB boot zone to replace the invalid boot code chunk 0 received from the NAND boot zone.

At block 312, the controller determines if all the boot code chunks that includes a valid authentication code have been received. In some examples, the controller may receive the same one or more boot code chunks from both the NAND boot zone and the HMB boot zone. When all the boot code chunks that includes a valid authentication code have been received at block 312, the boot process is completed at block 314. However, if not all of the boot code chunks have been received, the remaining boot code chunks are loaded at blocks 304 to the HMB boot zone and at block 308 to the NAND boot zone.

Figure 3B:
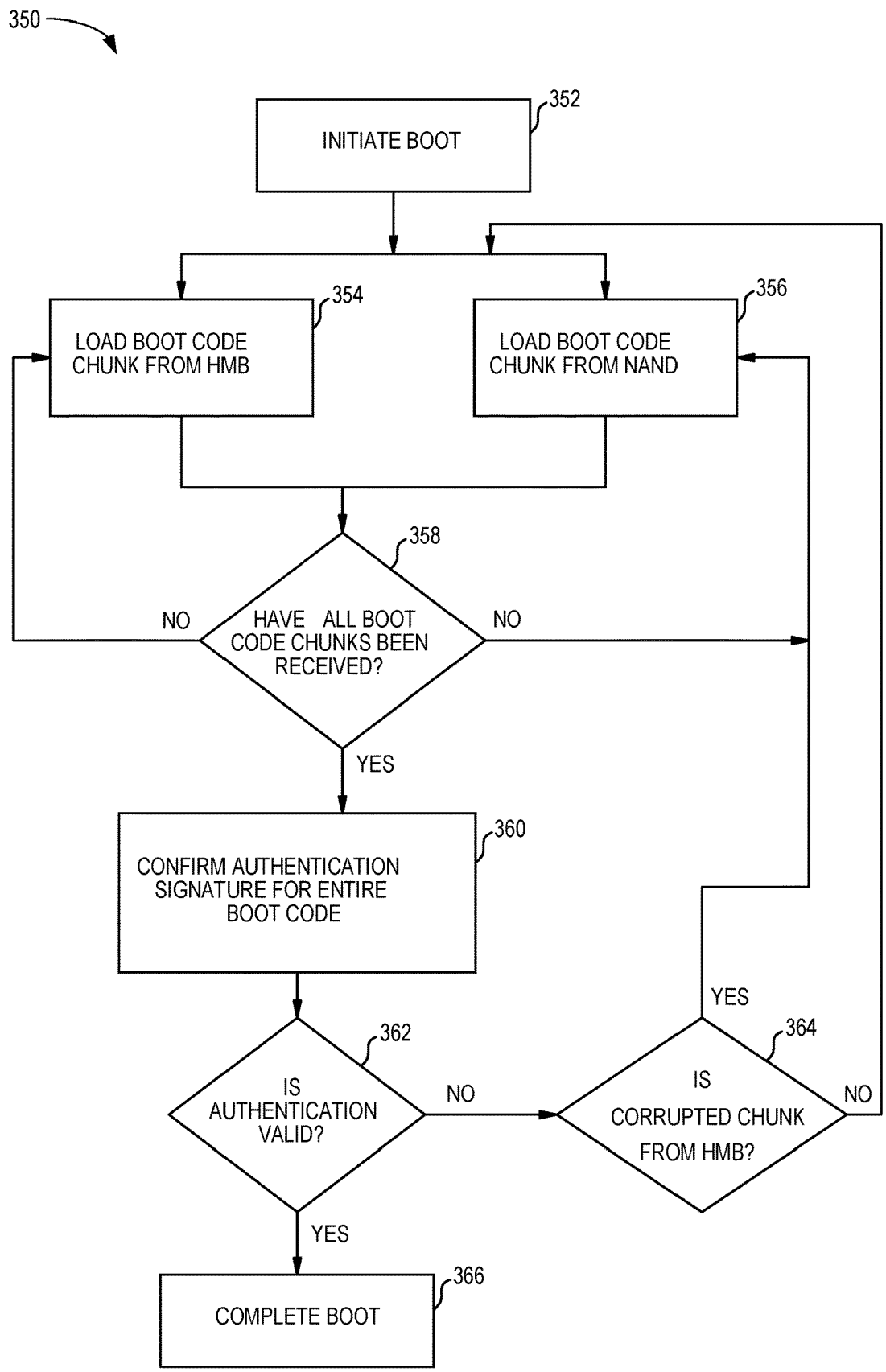
FIG. 3B is a flowchart illustrating a boot process, according to another embodiment.

FIG. 3B is a flowchart illustrating a boot process 350, according to another embodiment. The boot process 350 describes the boot operation of the data storage device when the controller checks for a valid authentication code or authentication signature for the entire boot code. The terms "authentication code" and "authentication signature" may be used interchangeably herein and may have the same meaning. The authentication code checks for a valid boot code chunk. At block 352, the boot operation is initiated. At block 354, the boot code chunks are fetched from the HMB boot zone and stored in the internal memory of the device controller. At block 356, the boot code chunks are fetched from the NAND boot zone and stored in the internal memory of the device controller. The load of the boot code chunks from both the HMB and the NAND at blocks 354 and 356 may occur concurrently.

The controller determines if all the boot code chunks have been received at the controller at block 358. If less than all of the boot code chunks have been received at the controller at block 358, the controller waits until the all of the boot code chunks have been received. The boot code chunks may be received from the HMB boot zone, the NAND boot zone, or from both the HMB boot zone and the NAND boot zone. After all the boot code chunks have been read from the HMB boot zone and the NAND boot zone and delivered to the controller at block 358, the controller confirms the authentication signature for the entire boot code at block 360.

If the authentication signature is valid at block 362, then the boot operation is completed. However, if the authentication signature is invalid, then the controller utilizes logic, such as the boot logic 134 of FIG. 1, to determine if the corrupted boot code chunk that resulted in the invalid authentication signature is from the HMB at block 364. If the corrupted boot code chunk is from the HMB, then the relevant boot code chunk is loaded from the NAND boot zone stored in the internal memory of the controller at block 356. However, if the corrupted boot code chunk is not from the HMB (i.e., from the NAND), then the relevant boot code chunk is loaded from the HMB and stored in the internal memory of the controller at block 354. The re-load of the boot code chunk from the other boot zone may occur for each instance of a corrupted boot code chunk. When the authentication signature is valid at block 362, the boot operation is completed at block 366.

Figure 4:
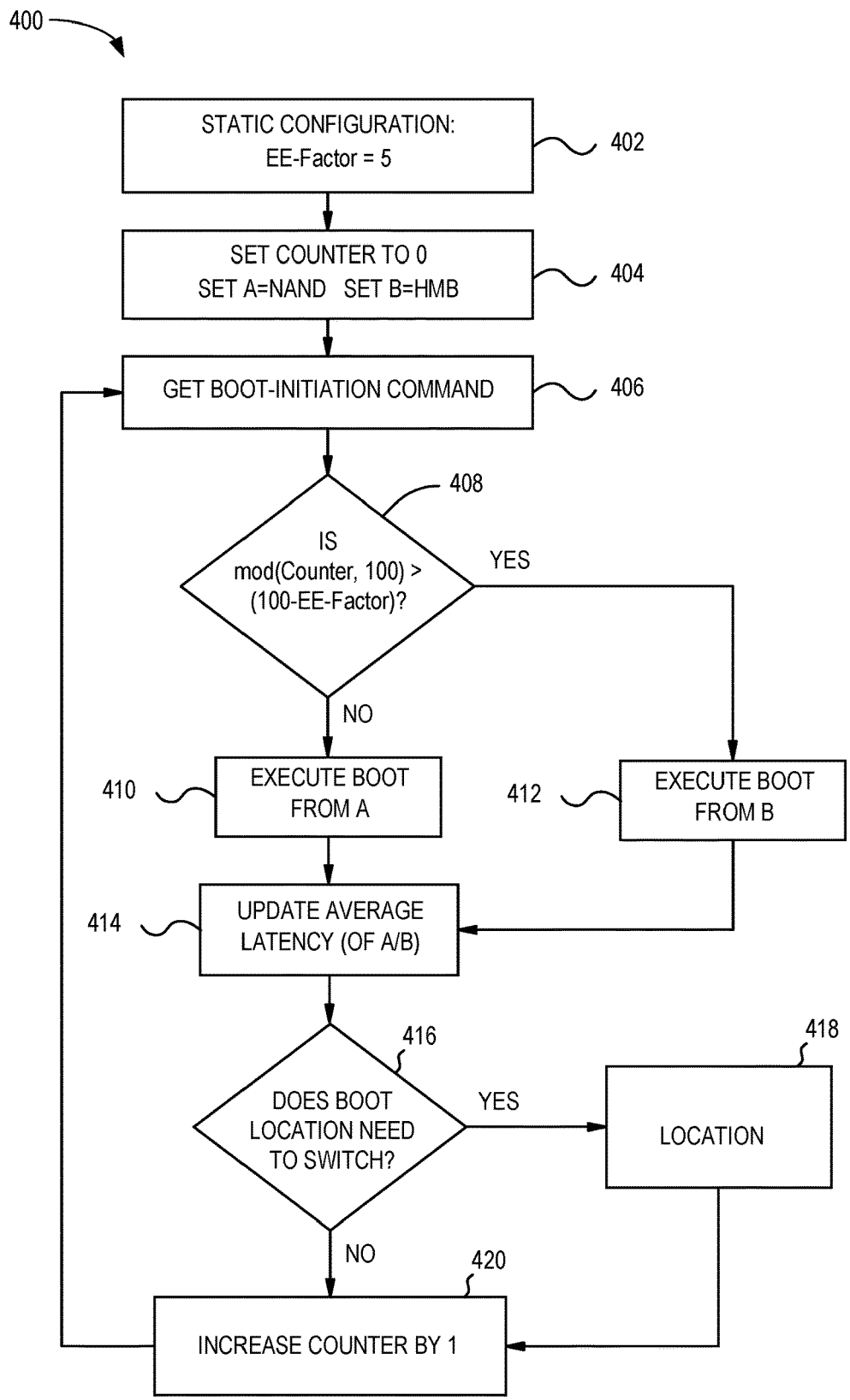
FIG. 4 is a flowchart illustrating a boot process, according to another embodiment.

FIG. 4 is a flowchart illustrating a boot process 400, according to another embodiment. The boot process 400 describes the boot operation of the data storage device during an "explore-exploit" trade off, such as when the host device (e.g., the host computer system 102 of FIG. 1) has an average latency that is different from the average latency of the one or more memory devices, (e.g., the NVM 116 of FIG. 1). The boot code is stored in both the HMB and the NAND. The exploitation portion of the "explore-exploit" trade off may refer to executing the boot operation from the location (i.e., the HMB or the NAND) that exhibits a faster boot latency. The exploration portion of the "explore-exploit" trade off may refer to the update of the current averaged estimation for the boot from the other location not utilized for the boot operation due to a slower boot latency. In one embodiment, the "explore-exploit" factor may be gradually reduced to about 0, where the more efficient location, either the HMB or the NAND, will be utilized for the boot operation.

At block 402, the static configuration is set, where the "explore-exploit" factor or EE-Factor equals 5. The EE-Factor may include values of between about 0 to about 100. At block 404, the controller initiates a counter, a set A, and a set B. The counter is set to about 0. In one embodiment, the set A refers to the NAND and the set B refers to the HMB. In the example of FIG. 4, set A has a faster average latency. In the example of FIG. 4, the set A is set to the NAND but it is understood that set A could be HMB. At block 406, a boot-initiation command is received. When the boot-initiation command is received, the boot-code chunks are loaded from the NAND boot zone and from the HMB boot zone.

At block 408, the controller determines if the remainder of the counter divided by 100 is greater than 100 minus the EE-Factor. When the remainder of the counter divided by 100 is less than 100 minus the EE-Factor, the storage device may utilize the boot-source with the lower performance or a slower average latency in order to update the current averaged estimation for the boot from the lower performance location. At block 410, the boot from set A, or the NAND, is executed in order to update the current averaged estimation for the boot because the remainder of the counter divided by 100 is less than 100 minus the EE-Factor. However, if the remainder of the counter divided by 100 is greater than 100 minus the EE-Factor at block 408, the boot executes from set B, or the HMB, at block 412.

At block 414, the average latency or the current averaged estimation for the boot from either set A or set B is calculated, tracked, and updated. At block 416, the controller determines if the boot location needs to be switched based on the average latency of each set, A and B, such that the location that indicates a better latency is marked with A. Generally, for values of EE-Factor<50, A will be utilized most of the time. If a switch is needed at block 416, then at block 418, the boot locations are switched. Thereafter, the counter is increased by 1 at block 420 and the next boot operation begins at block 406. For example, the controller may receive boot code chunks from the one or more memory devices, such as the NAND, and switch to receiving the boot code chunks from the host device, such as the HMB of the host computer system. In another example, the controller may receive boot code chunks from the host device, such as the HMB of the host computer system, and switch to receiving the boot code chunks from the one or more memory devices, such as the NAND. If the boot location does not need to switch from a first boot location to a second boot location at block 416, then the counter increase by 1 at block 420 and the next boot process 400 begins at block 406. In some embodiments, the boot process 400 may be utilized to appropriate boot code chunks unevenly to the HMB and the NAND to optimize the average latency of each location.

Figure 5:
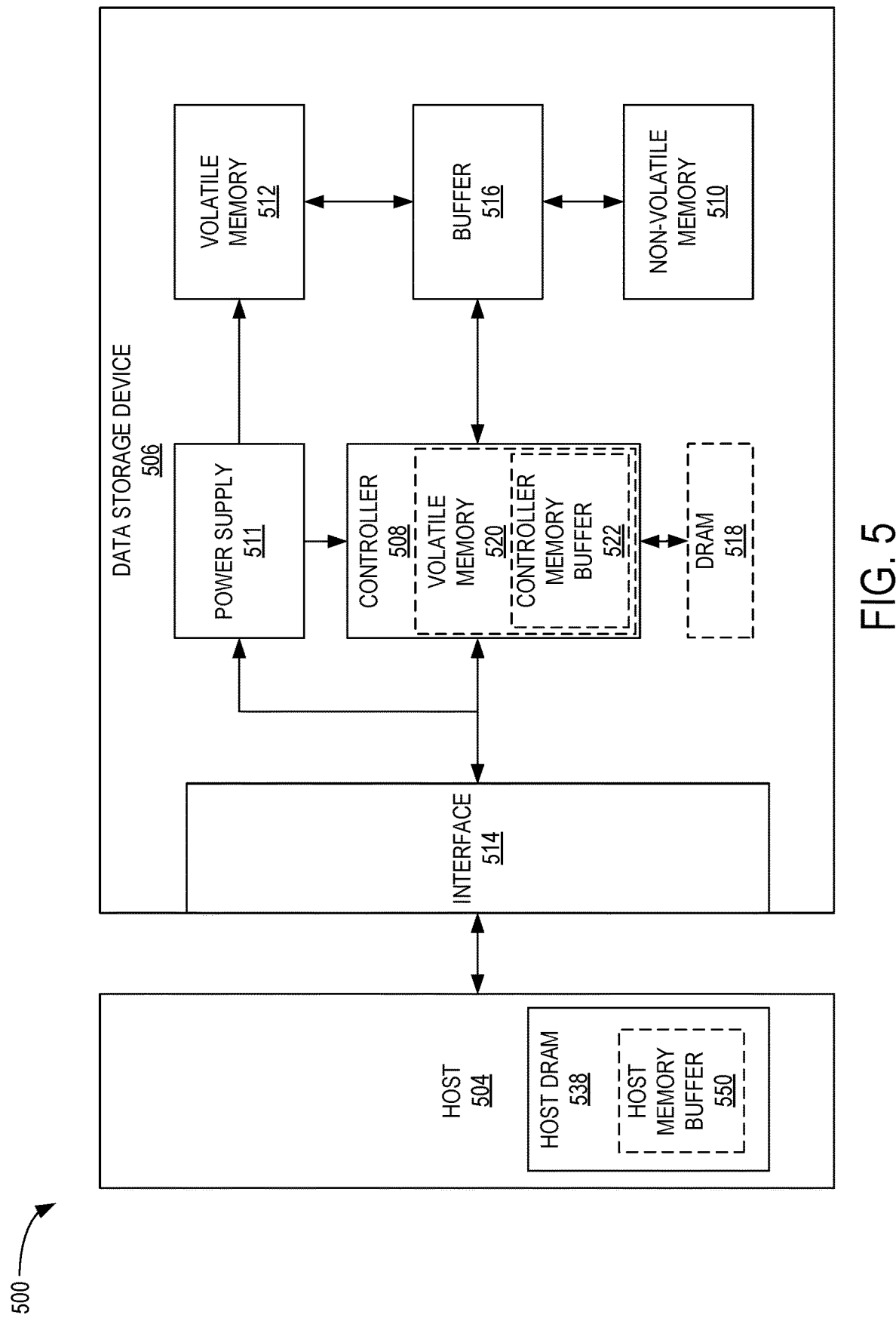
FIG. 5 is a schematic block diagram illustrating a storage system in which a data storage device may function as a storage device for a host device, according to certain embodiments.

FIG. 5 is a schematic block diagram illustrating a storage system 500 having a data storage device 506 that may function as a storage device for a host device 504, according to certain embodiments. For instance, the host device 504 may utilize a non-volatile memory (NVM) 510 included in data storage device 506 to store and retrieve data. The storage system 500 may be similar to the data storage system 100 of FIG. 1.

The host device 504 comprises a host DRAM 538. In some examples, the storage system 500 may include a plurality of storage devices, such as the data storage device 506, which may operate as a storage array. For instance, the storage system 500 may include a plurality of data storage devices 506 configured as a redundant array of inexpensive/independent disks (RAID) that collectively function as a mass storage device for the host device 504.

The host device 504 may store and/or retrieve data to and/or from one or more storage devices, such as the data storage device 506. As illustrated in FIG. 5, the host device 504 may communicate with the data storage device 506 via an interface 514. The host device 504 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 538 may optionally include a host memory buffer (HMB) 550. The HMB 550 is a portion of the host DRAM 538 that is allocated to the data storage device 506 for exclusive use by a controller 508 of the data storage device 506. For example, the controller 508 may store mapping data, buffered commands, logical to physical (L2P) tables, metadata, and the like in the HMB 550. In other words, the HMB 550 may be used by the controller 508 to store data that would normally be stored in a volatile memory 512, a buffer 516, an internal memory of the controller 508, such as static random access memory (SRAM), and the like. In examples where the data storage device 506 does not include a DRAM (i.e., optional DRAM 518), the controller 508 may utilize the HMB 550 as the DRAM of the data storage device 506.

The data storage device 506 includes the controller 508, NVM 510, a power supply 511, volatile memory 512, the interface 514, a write buffer 516, and an optional DRAM 518. In some examples, the data storage device 506 may include additional components not shown in FIG. 5 for the sake of clarity. For example, the data storage device 506 may include a printed circuit board (PCB) to which components of the data storage device 506 are mechanically attached and which includes electrically conductive traces that electrically interconnect components of the data storage device 506 or the like. In some examples, the physical dimensions and connector configurations of the data storage device 506 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 506 may be directly coupled (e.g., directly soldered or plugged into a connector) to a motherboard of the host device 504.

Interface 514 may include one or both of a data bus for exchanging data with the host device 504 and a control bus for exchanging commands with the host device 504. Interface 514 may operate in accordance with any suitable protocol. For example, the interface 514 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 514 (e.g., the data bus, the control bus, or both) is electrically connected to the controller 508, providing an electrical connection between the host device 504 and the controller 508, allowing data to be exchanged between the host device 504 and the controller 508. In some examples, the electrical connection of interface 514 may also permit the data storage device 506 to receive power from the host device 504. For example, as illustrated in FIG. 5, the power supply 511 may receive power from the host device 504 via interface 514.

The NVM 510 may include a plurality of memory devices or memory units. NVM 510 may be configured to store and/or retrieve data. For instance, a memory unit of NVM 510 may receive data and a message from controller 508 that instructs the memory unit to store the data. Similarly, the memory unit may receive a message from controller 508 that instructs the memory unit to retrieve data. In some examples, each of the memory units may be referred to as a die. In some examples, the NVM 510 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 510 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 508 may write data to and read data from NVM flash memory devices at the page level and erase data from NVM flash memory devices at the block level.

The power supply 511 may provide power to one or more components of the data storage device 506. When operating in a standard mode, the power supply 511 may provide power to one or more components using power provided by an external device, such as the host device 504. For instance, the power supply 511 may provide power to the one or more components using power received from the host device 504 via interface 514. In some examples, the power supply 511 may include one or more power storage components configured to provide power to the one or more components when operating in a shutdown mode, such as where power ceases to be received from the external device. In this way, the power supply 511 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 512 may be used by controller 508 to store information. Volatile memory 512 may include one or more volatile memory devices. In some examples, controller 508 may use volatile memory 512 as a cache. For instance, controller 508 may store cached information in volatile memory 512 until the cached information is written to the NVM 510. As illustrated in FIG. 5, volatile memory 512 may consume power received from the power supply 511. Examples of volatile memory 512 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 518 may be utilized to store mapping data, buffered commands, logical to physical (L2P) tables, metadata, cached data, and the like in the optional DRAM 518. In some examples, the data storage device 506 does not include the optional DRAM 518, such that the data storage device 506 is DRAM-less. In other examples, the data storage device 506 includes the optional DRAM 518.

Controller 508 may manage one or more operations of the data storage device 506. For instance, controller 508 may manage the reading of data from and/or the writing of data to the NVM 510. In some embodiments, when the data storage device 506 receives a write command from the host device 504, the controller 508 may initiate a data storage command to store data to the NVM 510 and monitor the progress of the data storage command. Controller 508 may determine at least one operational characteristic of the storage system 500 and store at least one operational characteristic in the NVM 510. In some embodiments, when the data storage device 506 receives a write command from the host device 504, the controller 508 temporarily stores the data associated with the write command in the internal memory or write buffer 516 before sending the data to the NVM 510.

The controller 508 may include an optional second volatile memory 520. The optional second volatile memory 520 may be similar to the volatile memory 512. For example, the optional second volatile memory 520 may be SRAM. The controller 508 may allocate a portion of the optional second volatile memory to the host device 504 as controller memory buffer (CMB) 522. The CMB 522 may be accessed directly by the host device 504. For example, rather than maintaining one or more submission queues in the host device 504, the host device 504 may utilize the CMB 522 to store the one or more submission queues normally maintained in the host device 504. In other words, the host device 504 may generate commands and store the generated commands, with or without the associated data, in the CMB 522, where the controller 508 accesses the CMB 522 in order to retrieve the stored generated commands and/or associated data.

During operation of the data storage device 506, the controller 508 may generate a computer assisted translation (CAT) table, which may be a logical-to-physical (L2P) table, to map logical block addresses (LBAs) used by the host device 504 to corresponding physical block addresses (PBAs). The CAT table may be a large table that is stored in the NVM 510 and may be partially stored in a volatile memory of the data storage device 506, such as the volatile memory 512 or the second volatile memory 520, in order to reduce read latency. When the controller 508 has access to the HMB 550, the controller 508 may optionally store a part of or an entirety of the CAT table in the HMB 550 in order to reduce a footprint of the CAT table in the data storage device 506, specifically in the volatile memory 512 or the second volatile memory 552. When the controller 508 stores a part of or an entirety of the CAT table in the HMB 550, there may be an associated overhead with moving the CAT table to the HMB 550. The associated overhead may include using the resources of the HMB 550 and managing a delta CAT table, which tracks differences between the CAT table stored in the HMB 550 and the CAT table stored in the NVM 510. However, by storing a part of or an entirety of the CAT table in the HMB 550, the controller 508 may leverage an access time of the HMB 550, where accessing the HMB 550, in some examples, may have a lower time penalty (e.g., access time) than accessing the NVM 510.

Figure 6:
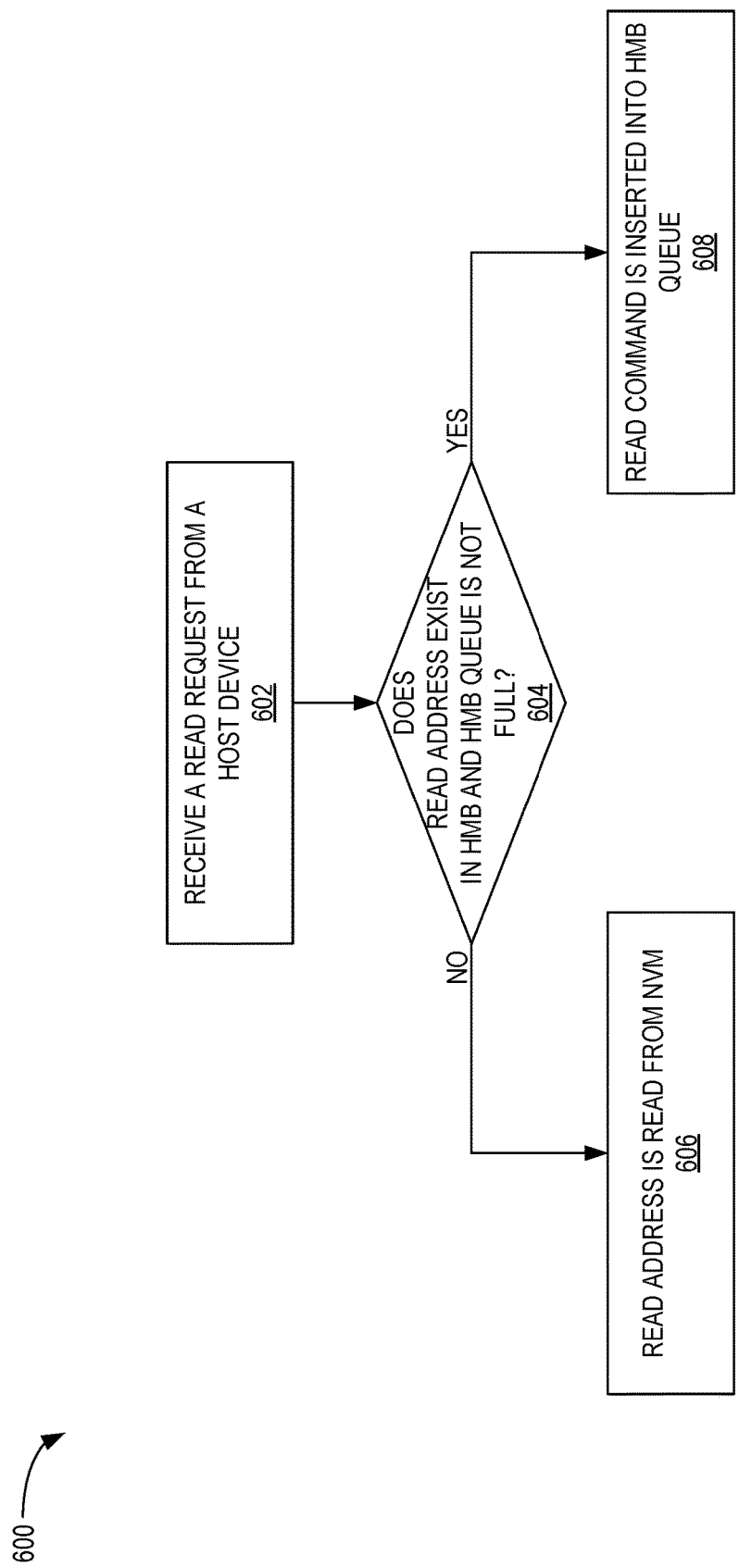
FIG. 6 is a flow diagram illustrating a method of determining to access an NVM or an HMB in response to receiving a read request, according to certain embodiments.

FIG. 6 is a flow diagram illustrating a method 600 of determining to access an NVM, such as the NVM 510 of FIG. 5, or an HMB, such as the HMB 550 of FIG. 5, in response to receiving a read request, according to certain embodiments. Method 600 may be implemented by a controller, such as the controller 508 of FIG. 5 or the device controller 120 of FIG. 1. For exemplary purposes, aspects of the storage system 500 of FIG. 5 may be referenced herein.

At block 602, the controller 508 receives a read request from the host device 504. At block 604, the controller 508 determines if the address associated with the read request is in the HMB 550 and whether a number of commands in a queue of the HMB 550 equals or exceeds a threshold number. The threshold number may equal a maximum number of commands that the queue of the HMB 550 may hold. For example, when the number of commands in the queue of the HMB 550 is equal to the threshold number, a new command is not able to be stored in the queue of the HMB 550 until a previous command in the queue of the HMB 550 is completed and/or removed from the queue of the HMB 550. In other examples where the threshold number is not equal to the maximum number of commands that the queue of the HMB 550 may hold, the threshold number may represent a number of commands optimized for the queue length.

If the address associated with the read request does not exist in the HMB 550 and/or the number of commands in the queue of the HMB 550 equals or exceeds the threshold number at block 604, then the address associated with the read request is read from the NVM 510 at block 606. However, if the address associated with the read request exists in the HMB 550 and the number of commands in the queue of the HMB 550 is less than the threshold number at block 604, then a read command associated with the read request is inserted into the queue of the HMB 550, such that the read address associated with the read request will be read from the HMB 550, at block 608.

Figure 7:
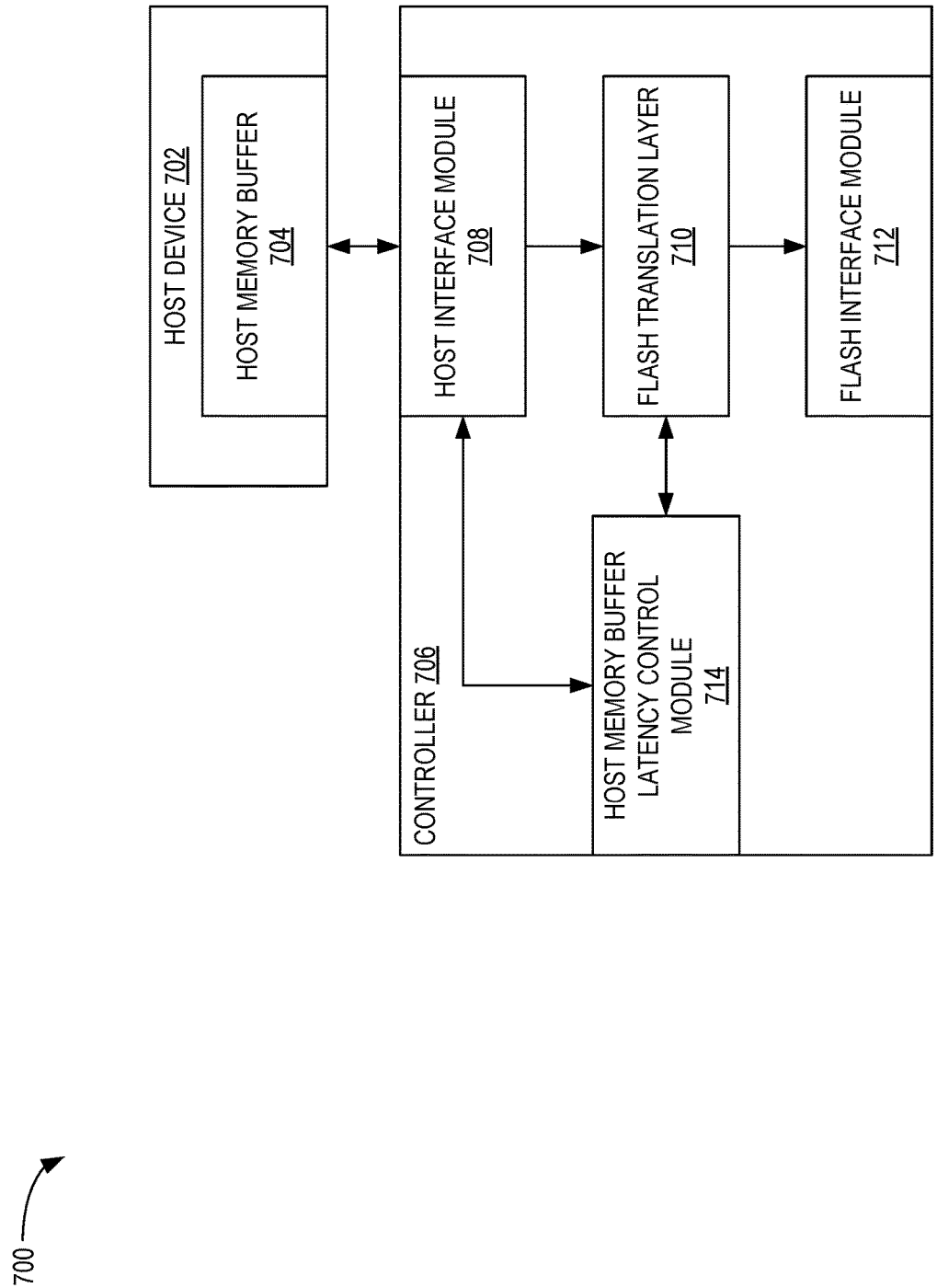
FIG. 7 is a schematic block diagram illustrating a storage system in which a controller of a data storage device includes a host memory buffer latency control unit, according to certain embodiments.

FIG. 7 is a schematic block diagram illustrating a storage system 700 in which a controller 706 of a data storage device, which may be the data storage device 506 of FIG. 5 or the data storage device 104 of FIG. 1, includes a host memory buffer latency control module 714, according to certain embodiments. The host device 702 includes a HMB 704. The HMB 704 may be the HMB 110 of FIG. 1 or the HMB 550 of FIG. 5.

The controller 706 includes a host interface module (HIM) 708, a flash translation layer (FTL) 710, a flash interface module (FIM) 712, and the host memory buffer latency control module 714. The HIM 708 is communicatively coupled to the HMB 704 of the host device 702, such that the controller 706 is able to send data to and retrieve data from the HMB 704. The HIM 708 is coupled to the FTL 710 and the host memory buffer latency control module 714. The FTL 710 may be configured to generate and maintain mappings (e.g., CAT table, L2P table, and the like), perform garbage collection, wear-leveling, error correction code (ECC) operations, bad block management, and the like. The FTL 710 is coupled the host memory buffer latency control module 714 and the FIM 712. The FIM 712 may be configured to perform read and write operations to an NVM, such as the NVM 510 of FIG. 5.

The host memory buffer latency control module 714 is configured to track a turnaround latency corresponding to one or more external memory devices. For example, when the controller 706 sends a read request for a read address to the HMB 704, the host memory buffer latency control module 714 tracks a time for the read request to be completed and for the read address to be received by the controller 706. Based on the latency to complete requests sent to the HMB 704, the host memory buffer latency control module 714 may derive whether a next request (e.g., read request for a read address located in both the HMB 704 and the NVM 510) should be directed or sent to the HMB 704 or the NVM 510 when the data associated with the next request is present in both the HMB 704 and the NVM 510.

The host memory buffer latency control module 714 may also store a plurality of read latencies of recently completed read commands (e.g., a first read latency of a first read command corresponding to a most recently received completion message, a second read latency of a second read command corresponding to a second most recently received completion message, etc.). In other words, the host memory buffer latency control module 714 may store a number of read latencies corresponding with previously received read command completion messages. The host memory buffer latency control module 714 generates an average turnaround latency and/or a maximum latency. In some examples, the host memory buffer latency control module 714 may also generate a median turnaround latency, a maximum turnaround latency, a histogram of read latencies, and other relevant turnaround latency metrics.

Figure 8:
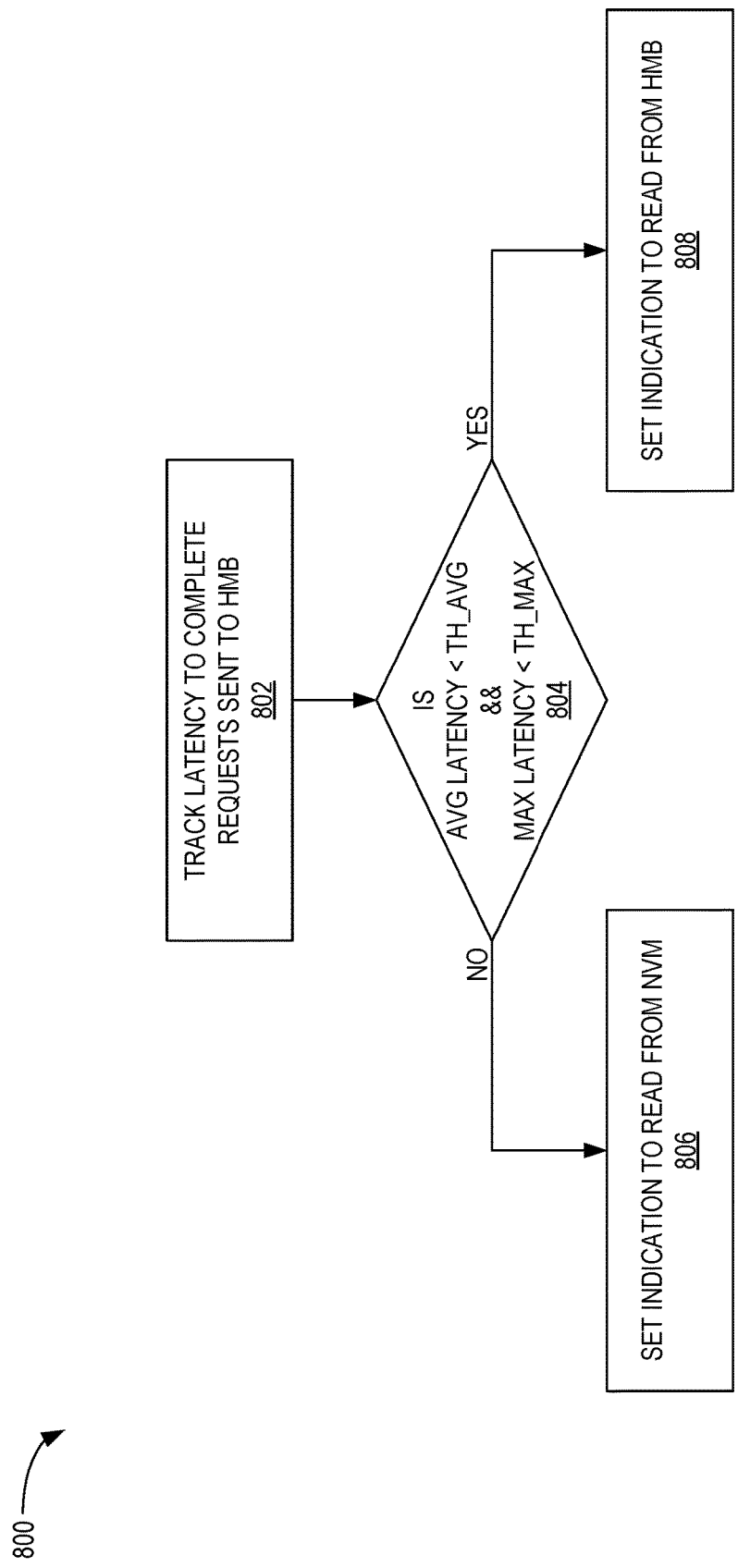
FIG. 8 is a flow diagram illustrating a method of setting an indication to read from NVM or setting an indication to read from HMB, according to certain embodiments.

FIG. 8 is a flow diagram illustrating a method 800 of setting an indication to read from NVM, such as the NVM 510 of FIG. 5, or setting an indication to read from HMB, such as the HMB 550 of FIG. 5, according to certain embodiments. Method 800 may be implemented by a controller, such as the controller 508 of FIG. 5. For exemplary purposes, aspects of the storage system 500 of FIG. 5 may be referenced herein.

At block 802, the host memory buffer latency control module 714 tracks a turnaround latency to complete requests sent to the HMB 550. At block 804, the host memory buffer latency control module 714 determines if the average turnaround latency is less than a threshold average turnaround latency and if the maximum turnaround latency is less than a threshold maximum turnaround latency. It is to be understood that the determination at block 804 may not be based on both the average turnaround latency and the maximum turnaround latency, but rather only the average turnaround latency or the maximum turnaround latency. It is to be further understood that the determination at block 804 may be based on other turnaround latency metrics. Furthermore, the thresholds utilized at block 804 may be adjusted or optimized based on an expected read latency of the NVM 510 and a die availability of the NVM 510. In other words, the thresholds may be derived based on an expected read time for data of the NVM 510 and/or an availability of the data corresponding to the read request in the NVM 510.

If the average turnaround latency is equal to or greater than a threshold average turnaround latency and if the maximum turnaround latency is equal to or greater than a threshold maximum turnaround latency at block 804, then the host memory buffer latency control module 714 sets an indication to read from the NVM 510 at block 806. However, if the average turnaround latency is less than a threshold average turnaround latency and if the maximum turnaround latency is less than a threshold maximum turnaround latency at block 804, then the host memory buffer latency control module 714 sets an indication to read from the HMB 550 at block 808.

Figure 9:
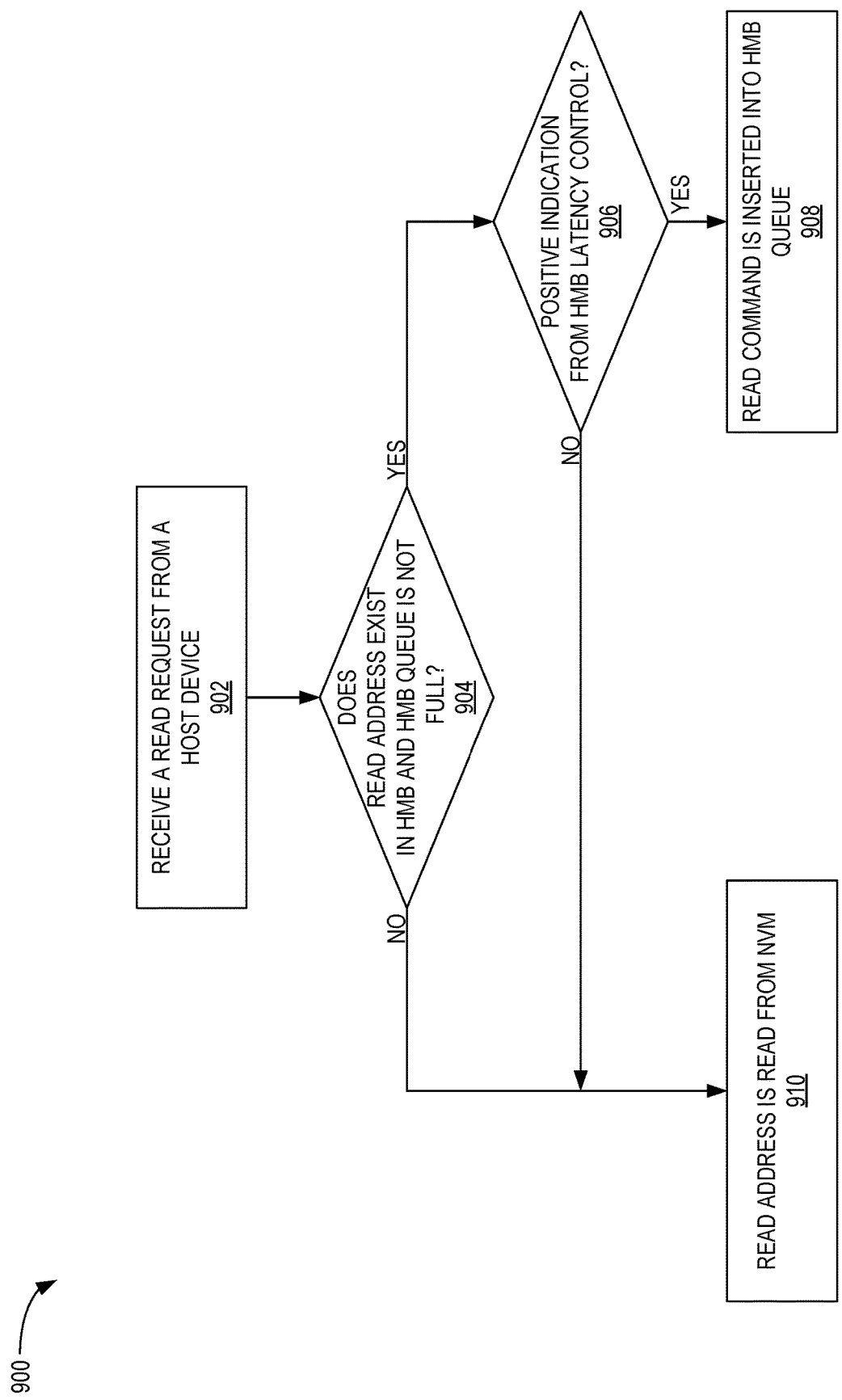
FIG. 9 is a flow diagram illustrating a method of determining to access an NVM or an HMB in response to receiving a read request, according to certain embodiments.

FIG. 9 is a flow diagram illustrating a method 900 of determining to access an NVM, such as the NVM 510 of FIG. 5, or an HMB, such as the HMB 550 of FIG. 5, in response to receiving a read request, according to certain embodiments. Method 900 may be implemented by a controller, such as the controller 508 of FIG. 5. For exemplary purposes, aspects of the storage system 500 of FIG. 5 and the storage system 700 of FIG. 7 may be referenced herein.

At block 902, the controller 508 receives a read request from the host device 504. At block 904, the controller 508 determines if the address associated with the read request is in the HMB 550 and whether a number of commands in a queue of the HMB 550 equals or exceeds a threshold number. The threshold number may equal a maximum number of commands that the queue of the HMB 550 may hold. For example, when the number of commands in the queue of the HMB 550 is equal to the threshold number, a new command is not able to be stored in the queue of the HMB 550 until a previous command in the queue of the HMB 550 is completed and/or removed from the queue of the HMB 550. In other examples where the threshold number is not equal to the maximum number of commands that the queue of the HMB 550 may hold, the threshold number may represent a number of commands optimized for the queue length.

If the address associated with the read request does not exist in the HMB 550 and/or the number of commands in the queue of the HMB 550 equals or exceeds the threshold number at block 904, then the address associated with the read request is read from the NVM 510 at block 910. However, if the address associated with the read request exists in the HMB 550 and the number of commands in the queue of the HMB 550 is less than the threshold number at block 904, then the controller 508 determines whether a positive indication (i.e., read from the HMB 550) has been received from the host memory buffer latency control module 714 at block 906.

If a positive indication has been received from the host memory buffer latency control module 714 at block 906, then a read command associated with the read request is inserted into the queue of the HMB 550, such that the read address associated with the read request will be read from the HMB 550, at block 908. However, if a negative indication (i.e., read from the NVM 510) has been received from the host memory buffer latency control module 714 at block 906, then the address associated with the read request is read from the NVM 510 at block 910.

It is to be understood that the host memory buffer latency control module 714 may be a latency control module monitoring other external memory devices, where the external memory device is external to the data storage device 506. In other words, the abovementioned embodiments described is not intended to be limited to only the HMB 550.

By tracking a turnaround latency to complete requests sent to an external memory device, the quality of service of random reads performed by the data storage device may be improved when data associated with the random read is located in both the external memory device and an internal memory device of the data storage device.

In one embodiment, a data storage device includes a memory device and a controller coupled to the memory device. The controller is configured to track a turnaround latency of another memory device, where the another memory device is external to the data storage device, and derive whether a next request should be sent to the another memory device or the memory device when a same data is present in both the another memory device and the memory device.

The turnaround latency is an amount of time to read the same data from the another memory device. The another memory device is a host memory buffer (HMB). The deriving further includes comparing the turnaround latency to a threshold latency. The controller is further configured to send the next request to the another memory device when the turnaround latency is less than the threshold latency. The controller is further configured to send the next request to the memory device when the turnaround latency is greater than or equal to the threshold latency. The deriving further comprises setting an indication to either the another memory device or the memory device based on the comparing. The threshold latency is based on either an average latency of a number of previous read requests to the another memory device and/or a maximum latency of the number of previous read requests to the another memory device. The controller is further configured to determine whether a read request address corresponding to the next request is present in the another memory device. The controller is further configured to determine if a queue corresponding to the another memory device is full. The controller is further configured to perform the deriving when the read request address corresponding to the next request is present in the another memory device and the queue corresponding to the another memory device is not full.

In another embodiment, a data storage device includes a memory device and a controller coupled to the memory device. The controller includes a latency control module. The latency control module is configured to track a turnaround latency to complete a request directed towards another memory device, where the another memory device is external to the data storage device, determine whether the turnaround latency is greater than or equal to a threshold latency, and set an indication to read from the memory device or the another memory device for a same data stored in both the memory device and the another memory device based on the determining.

The controller further includes a host interface module (HIM) coupled to the another memory device and the latency control module and a flash translation layer (FTL) coupled to the HIM and the latency control module. The controller is further configured to send a next read request to the memory device or the another memory device based on the indication. The next read request is for address data. The turnaround latency is a total amount of time for the request to be sent to the another memory device and to be completed. The threshold latency is based on an expected read time for the memory device and an availability of a requested data corresponding to the request in the memory device.

In another embodiment, a data storage device includes memory means and a controller coupled to the memory means. The controller is configured to receive a read request from a host device, determine that a read address corresponding to the read request exists in both the memory means and an another memory means, where the another memory means is disposed in the host device, and retrieve the read address from either the memory means or the another memory means based on a tracked turnaround latency, where the tracked turnaround latency corresponds to a completion latency of one or more previously completed read address retrieval commands.

The controller is further configured to determine that a queue of the another memory means is not full. The controller is further configured to retrieve the read address from the another memory means when the another memory means is not full and when the tracked turnaround latency is less than a threshold latency.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
 a memory device; and
 a controller coupled to the memory device, wherein the controller is configured to:
  track a turnaround latency of another memory device, wherein the another memory device is external to the data storage device;
  comparing the turnaround latency to a threshold latency to derive whether a next request should be sent to the another memory device or the memory device, wherein the threshold latency is based on:
   an average latency of a number of previous read requests to the another memory device; or a maximum latency of the number of previous read requests to the another memory device; and send a next request to the another memory device or the memory device based on whether a same data is present in both the another memory device and the memory device.

2. The data storage device of claim 1, wherein the turnaround latency is an amount of time to read the same data from the another memory device.

3. The data storage device of claim 1, wherein the another memory device is a host memory buffer (HMB).

4. The data storage device of claim 1, wherein the controller is further configured to send the next request to the another memory device when the turnaround latency is less than the threshold latency.

5. The data storage device of claim 1, wherein the controller is further configured to send the next request to the memory device when the turnaround latency is greater than or equal to the threshold latency.

6. The data storage device of claim 1, wherein the sending further comprises setting an indication to either the another memory device or the memory device based on the comparing.

7. The data storage device of claim 1, wherein the controller is further configured to determine whether a read request address corresponding to the next request is present in the another memory device.

* * * * *